Oct. 13, 1964  W. WEILAND  3,152,701
TRANSPORT ARRANGEMENT
Filed Jan. 3, 1961
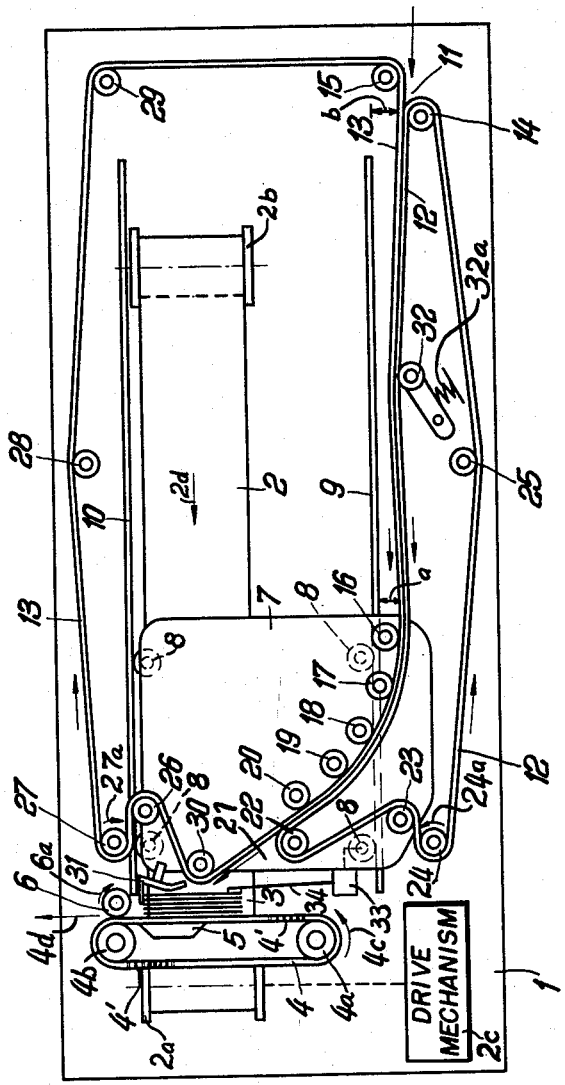
INVENTOR
Wolfgang Weiland
BY George H Spencer
ATTORNEY

United States Patent Office 3,152,701
Patented Oct. 13, 1964

3,152,701
TRANSPORT ARRANGEMENT
Wolfgang Weiland, Konstanz (Bodensee), Germany, assignor to Telefunken Aktiengesellschaft, Berlin, Germany
Filed Jan. 3, 1961, Ser. No. 80,237
12 Claims. (Cl. 214—7)

The present invention relates to a transport arrangement.

More particularly, the present invention relates to a transport arrangement for conveying flat items, such as letters, post cards, and the like, hereinafter referred to simply as flat articles.

There exist letter distribution systems which use so-called intermediate stacking devices in which a stack of flat articles is added to on one end, the articles being withdrawn individually from the other end of the stack. The purpose of such an intermediate or temporary stacking device is to make it possible to withdraw and process the articles at a desired predetermined constant rate, regardless of the rate at which the articles are being fed into the distribution system. In such an intermediate stacking device, the overall thickness of the stack is subject to change so that suitable provision must be made for varying either the position of the stacking means which place additional articles onto the stack or the position of the removing means which remove the articles individually, at the desired rate, from the other end of the stack. Both of these possibilities have already been put into practice. Thus, in an arrangement in which the position of the stacking device is varied as a function of the thickness of the stack at any given instant, the transport system which supplies articles to the stacking device must be such that it allows the distance between the feeding and discharge stations of the transport system to be varied.

In one existing type of intermediate stacking device, the problem is solved by providing a pivotable arm which carries a stacking belt as well as a supply trough for the incoming articles. This arm, however, cannot, due to geometrical considerations, have less than a certain minimum length, so that an intremediate stacking device incorporating such an arm requires a substantial amount of space.

In another type of intermediate stacking device, the stacking means are mounted on a carrier which is displaceable in the direction of the thickness of the stack, there being one transport arrangement mounted on the carrier for movement therewith and a second stationary transport arrangement running parallel to the carrier, each transporting arrangement consisting of conveyor belts or rollers for moving the articles in upright position. The articles are first introduced into the stationary transport arrangement from which they are extracted by a lock mechanism mounted on the carrier and transferred to the transport arrangement on the latter. While this type of system requires less space than the previously described one, it has been found that the lock mechanism is undesirable inasmuch as it requires a special drive and is otherwise not too desirable.

It is, therefore, an object of the present invention to provide a transport arrangement by means of which flat articles, such as letters, post cards, and the like, can be transported between two points or stations the distance between which is variable, which arrangement overcomes the above-described disadvantages.

It is another object of the instant invention to provide a transport arrangement of the stated type which is very simple, which is completely reliable in operation, and which will give long periods of trouble-free service.

With the above objects in view, the present invention concerns an apparatus for transporting flat articles, in upright position, between two points the distance between which is variable, one of which points is located on stationary support means and the other of which points is determined by the position of a carried mounted on the support means for movement relative thereto along a rectilinear path. According to the present invention, the transport arrangement comprises two endless belts and guide means for guiding the belts to run in superposed position through one reach of their travel between the two points. The guide means include a plurality of stationary guides, such as rollers, arranged on the support means and a plurality of movable guides, which may also be rollers, arranged on the carrier, the stationary and movable rollers being so positioned that each reach of travel of each band between each set of successive stationary and movable rollers extends in a direction which is substantially parallel to the rectilinear path.

Additional objects and advantages of the present invention will become apparent upon consideration of the following description when taken in conjunction with the accompanying drawing in which the single figure is a plan view of one embodiment of a transport arrangement according to the present invention.

Referring now to the drawing, there is shown a stationary support means in the form of a base plate 1 and an article support means in the form of an endless belt 2, the upper surface of which serves to support a stack 3 of flat articles, in upright position. The belt 2 runs about two rollers 2a and 2b, the former being driven by a suitable drive mechanism, shown schematically at 2c, thereby enabling the belt 2 to be moved in the direction of arrow 2d, together with the stack 3, as individual articles are being taken from the left or bottom end of the stack. This removal is accomplished by an endless belt 4 which runs about two rollers 4a and 4b, one of which is driven by an appropriate drive (not shown) in counter-clockwise direction, as indicated by the arrow 4c. The belt 4 has one or more perforated portions 4' which cooperate with a suction nozzle 5, in such a manner that whenever one of the perforated portions 4' enters into registration with the suction nozzle, the bottom article of the stack 3 will be drawn into engagement with the belt 4 and be moved, in the direction of the arrow 4d, to a further distribution system. An additional driving roller 6 is provided, this roller 6 rotating in the direction of arrow 6a and cooperating with the belt 4 to assist the latter in conveying the article in the direction of the arrow 4d. It will be understood, therefore, that as long as the belt 4 is driven at a constant rate, the articles in the stack will leave at a desired constant rate irrespective of the thickness of the stack 3.

The mechanism for feeding articles to the right or top end of the stack 3 comprises a movable carrier 7 which is arranged above the belt 2. The carrier 7 is equipped with running rollers 8 cooperating with two spaced lateral guide rails 9 and 10, the carrier 7 thus being mounted on the base plate 1 for movement relative thereto along a rectilinear path which extends in the direction of the thickness of the stack 3. The rail 10 may extend above the level of the support surface constituted by the belt 2 and thus serve as a lateral abutment for the articles making up the stack 3. The top of the stack constitutes the point at which articles are to be delivered. As will be described below, the position of the carrier 7 depends on the thickness of the stack, and it will thus be the position of the carrier 7 which determines the precise location of the discharge station of the transport system which moves the articles from the immovable feeding station of the system, indicated generally at 11. This transport system, which allows articles to be transported from the feeding station to the discharge station, even though the distance between these stations changes as the thickness of the stack 3 varies, will now be described.

The transport system comprises a first endless belt 12 and a second endless belt 13, which belts are guided by suitable guides, such as rollers, arranged partly on the base plate 1 and partly on the carrier 7. Hereinafter, the rollers mounted on the support means constituted by the base plate 1 will be referred to as "stationary" rollers and the rollers mounted on the carrier 7 will be referred to as "movable" rollers.

The belts 12 and 13 run, in superposed position, from first and second stationary rollers 14 and 15, respectively, toward a first movable roller 16, from which they move by way of additional common guiding rollers 17, 18, 19, 20 to the discharge station indicated generally at 21. The roller 16 is spaced from the rollers 14 and 15 at the feeding station such that the belts 12, 13 travel between these rollers through a reach which extends in a direction substantially parallel to the rectilinear path along which the carrier 7 is movable. The belt 12, which can be considered as the outer belt, runs about a return roller 22 and from there around a second movable roller 23 located at one side of the carrier 7 to a third stationary roller 24, from whence the belt 12 returns to the first stationary roller 14. One or more additional rollers 25 are provided, one or more of which can be spring-tensioned, for preventing undesirable oscillations.

The other belt 13, which can be considered as the inner belt, ultimately leads around a third movable roller 26 located at the opposite side of the carrier 7, and from there to a fourth stationary roller 27, from whence the belt 13 returns to the second stationary roller 15 by way of a return roller 29. As in the case of belt 12, one or more additional rollers 28 are provided, one or more of which can be spring-tensioned, for suppressing oscillations.

As is clearly shown in the drawing, the movable roller 23 and stationary roller 24 are spaced from each other such that the belt 12 will travel therebetween in a direction substantially parallel to the rectilinear path along which the carrier 7 moves; the same holds true for the movable roller 26 and the stationary roller 27 which are likewise so spaced from each other that the belt 13 travelling therebetween will be oriented substantially parallel to the rectilinear path of the carrier 7. Thus, it will be seen that the rollers are so arranged that each reach of travel of each band between each set of successive stationary and movable rollers extends in a direction substantially parallel to the above-mentioned rectilinear path of the carrier 7.

One of the stationary rollers associated with each belt is a driving roller, as, for example, the rollers 24 and 27, as indicated by the arrows 24a and 27a. The driving means for these rollers are conventional and therefore not shown.

The carrier 7 also carries an additional roller 30 which is spaced from the roller 20, which is the last of the rollers common to both belts, such that this roller 30 serves as a stacking roller for stacking the articles at the discharge station. In order to promote even stacking, the carrier 7 further carries an angled abutment piece 31. As stated above, the rail 10 extends above the level of the belt 2 so as to serve as a lateral abutment for the articles in the stack 3.

Also shown is a tensioned roller 32, coacting with a spring 32a, which is arranged in the reach of the superposed belts 12 and 13 extending between the stationary rollers 14, 15 and the movable roller 16. This roller 32 ensures a firm superposition of the belts 12 and 13 even when the stack 3 is relatively thin, as shown in the drawing, without preventing the carrier from moving back as the thickness of the stack increases. It is true that the action of the roller 32 will cause the reach between the stationary rollers 14, 15 and the movable roller 16 to deviate to a greater or lesser extent from an orientation parallel to the rectilinear path of the carrier 7, and it should be understood, therefore, that the expression "substantially parallel" includes a roller arrangement in which the superposed belts 12, 13 will be spaced from the rail 9 substantially the same distance at rollers 14, 15 as they are spaced from this rail at the roller 16, i.e., an arrangement wherein the distance $a$ is approximately equal to the distance $b$ so that if not the belts themselves then a line tangent to roller 16 and passing between rollers 14 and 15 will be substantially parallel to the rectilinear path of the carrier 7.

In operation, the articles are supplied to the feeding station 11 by means of any appropriate transport system (not shown) and are moved at relatively high speed to the discharge station 21 and onto the belt 2 where they will be added to the stack 3. It should be noted that the articles will, in practice, readily move from the discharge station 21, which is shown as being spaced a short distance from the top end of the stack 3, because the articles will arrive at 21 at relatively high speed so their inertia will carry them to the stack 3. This effect is enhanced by the action of the stacking roller 30.

The carrier is moved rightwardly or leftwardly, depending on whether the thickness of the stack 3 increases or decreases, by a suitable reversible drive mechanism. This mechanism may be mounted on the carrier, as shown schematically at 33, and connected to one of the rollers 8. The drive mechanism is also connected to a pressure-sensitive switch having a feeler, shown schematically at 34, which switch has two limit positions and an intermediate rest position. The feeler engages the top of the stack 3 and actuates the switch in such a manner that when the thickness of the stack decreases, the carrier 7 is moved leftwardly, when the thickness of the stack increases, the carrier 7 is moved rightwardly, and when the thickness of the stack remains constant, which will occur when the rate at which the articles are being added to the stack equals the rate at which the belt 4 removes articles from the bottom of the stack, the carrier 7 will remain at rest. It will be appreciated that thanks to the above-described arrangement of stationary and movable rollers, such movement of the carrier 7 is unimpeded by the belts 12 and 13 and the transporting of articles can continue uninterrupted desipte changes in the thickness of the stack 3. Thus, should the carrier 7 move, for example, rightwardly, the length of the reach of the belts 12 and 13 between the movable roller 16 and the stationary rollers 14, 15 decreases an amount equal to the increase of the length of the reach of belt 12 between movable roller 23 and stationary roller 24 and also equal to the increase of the length of the reach of belt 13 between movable roller 26 and stationary roller 27. Consequently, the belts will retain their properly tensioned condition in every position of the carrier 7.

It will be understood that the above description of the present invention is susceptible to various modifications, changes and adaptations, and the same are intended to be comprehended within the meaning and range of equivalents of the appended claims.

I claim:

1. In an apparatus for transporting flat articles, in upright position, between two points the distance between which is variable, one of which points is located on stationary support means and the other of which points is determined by the position of a carrier mounted on said support means for movement relative thereto along a rectilinear path, the combination which comprises first and second endless belts and guide means for guiding said belts to run in superposed position through one reach of their travel between said points, said guide means including first and second stationary guides arranged on said support means at said one point for guiding said first and second belts, respectively, a first movable guide arranged on said carrier for guiding both of said belts, said first movable guide being spaced from said first and second stationary guides such that said belts travel therebetween in a direction substantially parallel to said rectilinear path, guiding means arranged on said carrier for guiding said belts between said first movable guide and said other point, a second movable guide arranged on said carrier for guiding said first belt between said other point and one side of said carrier, a third stationary guide arranged on said support means for guiding said first belt, said third stationary guide being spaced from said second movable guide such that said first belt travels therebetween in a direction substantially parallel to said rectilinear path, a third movable guide arranged on said carrier for guiding said second belt between said other point and the opposite side of said carrier, and a fourth stationary guide arranged on said support means for guiding said second belt, said fourth stationary guide being spaced from said third movable guide such that said second belt travels therebetween in a direction substantially parallel to said rectilinear path, said first belt also running between said first and third stationary guides and said second belt also running between said second and fourth stationary guides.

2. The combination defined in claim 1 wherein each of said movable and stationary guides is a roller.

3. The combination defined in claim 2, further comprising a tensioned roller acting against one of said belts for pressing the two belts together.

4. The combination defined in claim 3 wherein said roller is spring-pressed and engages said first belt.

5. In an apparatus having stationary support means and a carrier mounted on said support means for movement relative thereto along a rectilinear path, wherein at one point on said stationary support means there is a feeding station and at a second point which is determined by the position of said carrier there is a discharge station, a transport arrangement for transporting flat articles, in upright position, from said feeding station to said discharge station, said transport arrangement comprising first and second endless belts and roller means for guiding said belts to run in superposed position through that reach of their travel which extends from said feeding station to said discharge station, said roller means including first and second stationary rollers arranged on said support means at said feeding station for guiding said first and second belts, a first movable roller arranged on said carrier for guiding both of said belts, said first movable roller being spaced from said first and second stationary rollers such that said belts travel from said first and second stationary rollers to said first movable roller, in superposed position, in a direction substantially parallel to said rectilinear path, guiding rollers arranged on said carrier for guiding said belts, in superposed position, from said first movable roller to said discharge station on said carrier, a second movable roller arranged on said carrier for guiding said first belt from said discharge station to one side of said carrier, a third stationary roller arranged on said support means for guiding said first belt, said third stationary roller being spaced from said second movable roller such that said first belt travels from said second movable roller to said third stationary roller in a direction substantially parallel to said rectilinear path, a third movable roller arranged on said carrier for guiding said second belt from said discharge station to the opposite side of said carrier, and a fourth stationary roller arranged on said support means for guiding said second belt, said fourth stationary roller being spaced from said third movable roller such that said second belt travels from said third movable roller to said fourth stationary roller in a direction substantially parallel to said rectilinear path, said first belt running from said third stationary roller back to said first stationary roller and said second belt running from said fourth stationary roller back to said second stationary roller.

6. The combination defined in claim 5 wherein said guiding rollers on said carrier include a plurality of common rollers for guiding said belts, in superposed position, toward said discharge station.

7. The combination defined in claim 6 wherein said guiding rollers further include an additional roller spaced from the last of said common rollers such that said additional roller serves as a stacking roller for stacking the articles at said discharge station.

8. The combination defined in claim 5 wherein means are provided at said discharge station which form a support surface for supporting the articles being transported to said discharge station, thereby enabling the articles to be stacked.

9. The combination defined in claim 8 wherein said carrier is guided for its rectilinear movement by spaced lateral guide rails, one of said rails extending above the level of said support surface and thus serving as a lateral abutment for articles being stacked on said support surface.

10. In an apparatus for transporting flat articles, in upright position, between two points the distance between which is variable, one of which points is located on stationary support means and the other of which points is determined by the position of a carrier mounted on said support means for movement relative thereto along a rectilinear path, the combination which comprises two endless belts and guide means for guiding said belts to run in side-by-side position through one reach of their travel between said points whereby the flat articles may be transported between said belts in upright position, said guide means including a plurality of stationary guides arranged on said support means and a plurality of movable guides arranged on said carrier, said stationary and movable guides being so positioned that each reach of travel of each belt between each set of successive stationary and movable guides extends in a direction substantially parallel to said rectilinear path.

11. The combination defined in claim 10 wherein each of said movable and stationary guides is a roller.

12. In a system for stacking flat articles, in upright position, wherein allowance is made for changes in the thickness of the stack, the combination which comprises: support means at one point of which there is located a feeding station; means for receiving a stack of flat articles, the end of the stack onto which additional flat articles are to be placed constituting a discharge station; a carrier mounted on said support means for movement along a rectilinear path which extends in the direction in which the stack changes thickness, depending on the number of articles constituting the stack; and a transport arrangement for transporting the flat articles, in upright position, from said feeding station to said discharge station, said transport arrangement incorporating first and second endless belts and roller means for guiding said belts to run in superposed position through that reach of their travel which extends from said feeding station to said discharge station, said roller means including first and second stationary rollers arranged on said support means at said feeding station for guiding said first and second belts, a first movable roller arranged on said carrier for guiding both of said belts, said first movable roller being spaced from said first and second stationary rollers such that said belts travel from said first and second stationary rollers to said first movable roller, in superposed position, in a direction substantially parallel to said rectilinear path, guiding rollers arranged on said carrier for guiding said belts, in superposed position, from said first movable roller to said discharge station on said carrier, a second movable roller arranged on said carrier for guiding said first belt from said discharge station to one side of said carrier, a third stationary roller arranged on said support means for guiding said first belt, said third stationary roller being spaced from said second movable roller such that said first belt travels from said second movable roller to said third stationary roller in a direction substantially parallel to said rectilinear path, a third movable roller arranged on said carrier for guiding said second belt from said discharge station to the opposite side of said carrier, and a fourth stationary roller arranged on said support means for guiding said second belt, said fourth stationary roller being spaced from said third movable roller such that said second belt travels from said third movable roller to said fourth stationary roller in a direction substantially parallel to said rectilinear path, said first belt running from said third stationary roller back to said first stationary roller and said second belt running from said fourth stationary roller back to said second stationary roller.

References Cited in the file of this patent

UNITED STATES PATENTS

| | | |
|---|---|---|
| 1,072,388 | Madigan | Sept. 2, 1913 |
| 2,737,390 | Morgan et al. | Mar. 6, 1956 |
| 2,941,653 | Kriemelmeyer | June 21, 1960 |

FOREIGN PATENTS

| | | |
|---|---|---|
| 509,128 | Germany | Oct. 4, 1930 |